(12) United States Patent
Sakakibara

(10) Patent No.: US 7,886,426 B2
(45) Date of Patent: Feb. 15, 2011

(54) STATOR MANUFACTURING APPARATUS

(75) Inventor: Hiroshi Sakakibara, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 12/496,986

(22) Filed: Jul. 2, 2009

(65) Prior Publication Data

US 2010/0018039 A1    Jan. 28, 2010

(30) Foreign Application Priority Data

Jul. 22, 2008  (JP) ............................ 2008-188634
Sep. 9, 2008   (JP) ............................ 2008-231255

(51) Int. Cl.
  *B23P 19/00*   (2006.01)
  *H02K 15/00*   (2006.01)
(52) U.S. Cl. .................. 29/732; 29/281.5; 29/738; 100/291
(58) Field of Classification Search ........... 29/732–738, 29/596–598, 281.5, 468, 464; 100/291; 310/168, 310/216.52, 218
See application file for complete search history.

(56) References Cited

U.S. PATENT DOCUMENTS 5,062,200 A * 11/1991 Lanfranco .................... 29/732
6,807,724 B2 * 10/2004 Yasuda et al. ................. 29/732
7,293,350 B2 * 11/2007 Sawada ....................... 29/732
7,415,758 B2 * 8/2008 Hauser et al. ................. 29/736
2010/0018039 A1 * 1/2010 Sakakiabara ................. 29/732

FOREIGN PATENT DOCUMENTS

JP    11-341748 A    12/1999

* cited by examiner

*Primary Examiner*—Minh Trinh
(74) *Attorney, Agent, or Firm*—Arent Fox LLP

(57) ABSTRACT

A stator manufacturing apparatus for manufacturing a stator efficiently includes a base plate, a plurality of radially inward displacing jigs disposed radially in an annular pattern on the base plate and which are radially displaceable toward and away from each other, a plurality of core holding jigs disposed radially inward of the radially inward displacing jigs and which are radially displaceable toward and away from each other, a movable plate disposed vertically upward of the base plate and which is vertically movable toward and away from the base plate, a cam disposed on the movable plate for displacing the radially inward displacing jigs radially toward each other when the movable plate is lowered, and a spacer holding jig for holding spacers that are inserted between adjacent separate cores.

7 Claims, 14 Drawing Sheets

STATOR MANUFACTURING APPARATUS

CROSS-REFERENCE TO RELATED APPLICATION

This application claims the priority of JP Application No. 2008-188634, filed Jul. 22, 2008, the entire specification, claims and drawings of which are incorporated herewith by reference.

BACKGROUND OF THE INVENTION

1. Field of the Invention

The present invention relates to a stator manufacturing apparatus for joining a plurality of separate cores, each carrying a coil wound thereon, into an annular stator.

2. Description of the Related Art

Heretofore, there has been known a stator for electric rotary machines, which comprises a plurality of interconnected separate cores. Each of the separate cores comprises an arcuate yoke, a pole extending radially inward from the yoke, and a coil wound around the pole.

The yoke for each of the separate cores has a recess defined in a portion thereof, and a tooth provided on another portion thereof. The recess of the yoke of one of the separate cores receives therein the tooth of the yoke of an adjacent right-hand separate core, and also receives the tooth of the yoke of one of the separate cores that is fitted into the recess of the yoke of an adjacent left-hand separate core. The yokes are thus interconnected by an interfitting engagement of recesses and teeth, thereby combining the separate cores into an annular stator.

For the purpose of improving performance of electric rotary machines having such a stator, attempts have been made in the art to increase the number of windings of the coil on each separate core, so as to increase the space factor of slots between the poles. For example, Japanese Laid-Open Patent Publication No. 11-341748 discloses a stator assembling method, whereby the coil wound around a pole is compressed to reduce the occupied volume of the coil and thereby increase the space factor.

Specifically, a winding is wound a plurality of times around the pole to form a coil, which is greater in size than the coil storage space that accommodates the coil. In this manner, a plurality of separate cores are produced. Then, the separate cores are arranged in an annular pattern with insulators inserted between adjacent coils of the separate cores.

The annularly arranged separate cores are then compressed and displaced radially inward. The coils of adjacent separate cores, with the insulators interposed therebetween, are pressed together. Also, windings that are positioned outside of the coil storage spaces are pressed into the coil storage spaces.

With the windings pressed into the coil storage spaces, the separate cores are joined together into an annular stator.

Therefore, it has been known in the art to arrange a plurality of separate cores in an annular pattern, and thereafter displace the separate cores simultaneously radially inward to compress the coils. However, Japanese Laid-Open Patent Publication No. 11-341748 discloses nothing concerning structural apparatus details for carrying out the above method.

SUMMARY OF THE INVENTION

It is a general object of the present invention to provide a stator manufacturing apparatus, which is capable of compressing coils into a given shape when separate cores with the coils wound therearound are joined together into an annular stator.

A major object of the present invention is to provide a stator manufacturing apparatus, which can increase the space factor of windings.

Another object of the present invention is to provide a stator manufacturing apparatus, which is capable of assembling a stator efficiently.

According to an aspect of the present invention, there is provided a stator manufacturing apparatus for joining a plurality of separate cores, each carrying a coil wound thereon, into an annular stator, comprising a base plate, a plurality of radially inward displacing jigs disposed radially in an annular pattern on the base plate and which are radially displaceable toward and away from each other, a plurality of core holding jigs disposed radially inward of the radially inward displacing jigs and which are radially displaceable toward and away from each other, a movable plate disposed vertically upward of the base plate and which is vertically movable toward and away from the base plate, a cam disposed on the movable plate for displacing the radially inward displacing jigs radially toward each other when the movable plate is lowered, and a spacer holding jig for holding spacers that are inserted between adjacent ones of the separate cores, wherein when the cam is lowered in unison with the movable plate, the cam presses the radially inward displacing jigs to displace the radially inward displacing jigs radially toward each other for thereby compressing the coils radially, and wherein the core holding jigs are displaced radially toward each other in unison with the radially inward displacing jigs for thereby joining the separate cores held by the core holding jigs into a stator.

With the above arrangement, the separate cores can be joined annularly into a stator simply by lowering the cam, so as to press the radially inward displacing jigs and the core holding jigs radially inward, for thereby displacing the radially inward displacing jigs and the core holding jigs radially inward toward each other, thus reducing the diameters of their respective annular patterns.

At the same time that the stator is produced, the side surfaces of the coils are compressed. Since the stator can be assembled and the coils can be compressed simply by lowering the cam, the stator can be fabricated highly efficiently.

Further, since the coils are compressed, the space factor of the stator is increased.

The stator manufacturing apparatus according to the present invention is thus capable of joining separate cores into an annular stator while compressing the side surfaces of the coils in a single process. Therefore, the stator can be fabricated highly efficiently, and the space factor of the stator is increased.

Preferably, the radially inward displacing jigs include respective lower surface pressing members for pressing respective lower surfaces of the coils, and the core holding jigs include respective upper surface pressing members for pressing respective upper surfaces of the coils. The movable plate may include a pressing means, which is vertically movably mounted thereon.

After the coils have been compressed radially, the pressing means is lowered vertically downward from the movable plate, thus causing the lower surface pressing members and the upper surface pressing members to compress the lower and upper surfaces, respectively, of the coils. Since not only the side surfaces of the coils, but also the upper and lower surfaces of the coils can be compressed, the efficiency with which the stator is fabricated, as well as the space factor of the stator, is further increased.

The mechanism for compressing the side surfaces of the coils and the mechanism for compressing the upper and lower surfaces of the coils may be incorporated in one piece of equipment. Therefore, equipment costs for the stator manufacturing apparatus can be reduced, and the stator manufacturing apparatus can be simplified in structure and reduced in size.

Preferably, the core holding jigs include respective core upper surface holders for holding respective upper surfaces of the separate cores vertically downward, and the radially inward displacing jigs include respective core urging means for urging respective lower surfaces of the separate cores vertically upward. The separate cores, which are urged by the core urging means, are held against the core upper surface holders, respectively.

With the above arrangement, the separate cores have equal heights respectively, and hence the separate cores within the produced stator also have heights that are equal to each other. Therefore, connectors at the ends of the coils, and silicone resin inlets on upper surfaces of the separator cores, are positioned accurately.

The stator manufacturing apparatus may further include a holder for holding the core holding jigs in an annular pattern. The holder may be gripped by a gripping means to make it highly easy to set the core holding jigs and the separate cores on the radially inward displacing jigs.

The stator manufacturing apparatus may also include an engaging member positioned centrally in the annular pattern made up of the radially inward displacing jigs, and the holder may include a columnar member positioned centrally in the annular pattern made up of the core holding jigs. When the engaging member engages within an insertion opening defined in a lower end of the columnar member, the holder becomes positioned and fixed, so as to bring the annular pattern made up of the radially inward displacing jigs and the annular pattern made up of the core holding jigs into coaxial alignment with each other.

Since the center of the annular pattern made up of the radially inward displacing jigs and the center of the annular pattern made up of the core holding jigs are aligned with each other, the core holding jigs are displaced accurately toward the center while the radially inward displacing jigs are displaced radially inward. Since the separate cores are prevented from being shifted out of position, the stator can be assembled with ease.

The stator manufacturing apparatus preferably includes a spacer moving means for moving the spacer holding jig vertically downward. The spacers provide clearances between the adjacent coils when the stator is assembled. After the coils have been compressed radially, the spacer moving means moves the spacer holding jig vertically downward so as to release the spacers from between the adjacent separate cores. Clearances between the adjacent coils thus are maintained, thereby preventing the adjacent coils from becoming short-circuited.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

A stator manufacturing apparatus according to a preferred embodiment of the present invention will be described in detail below with reference to the accompanying drawings.

Figure 1:
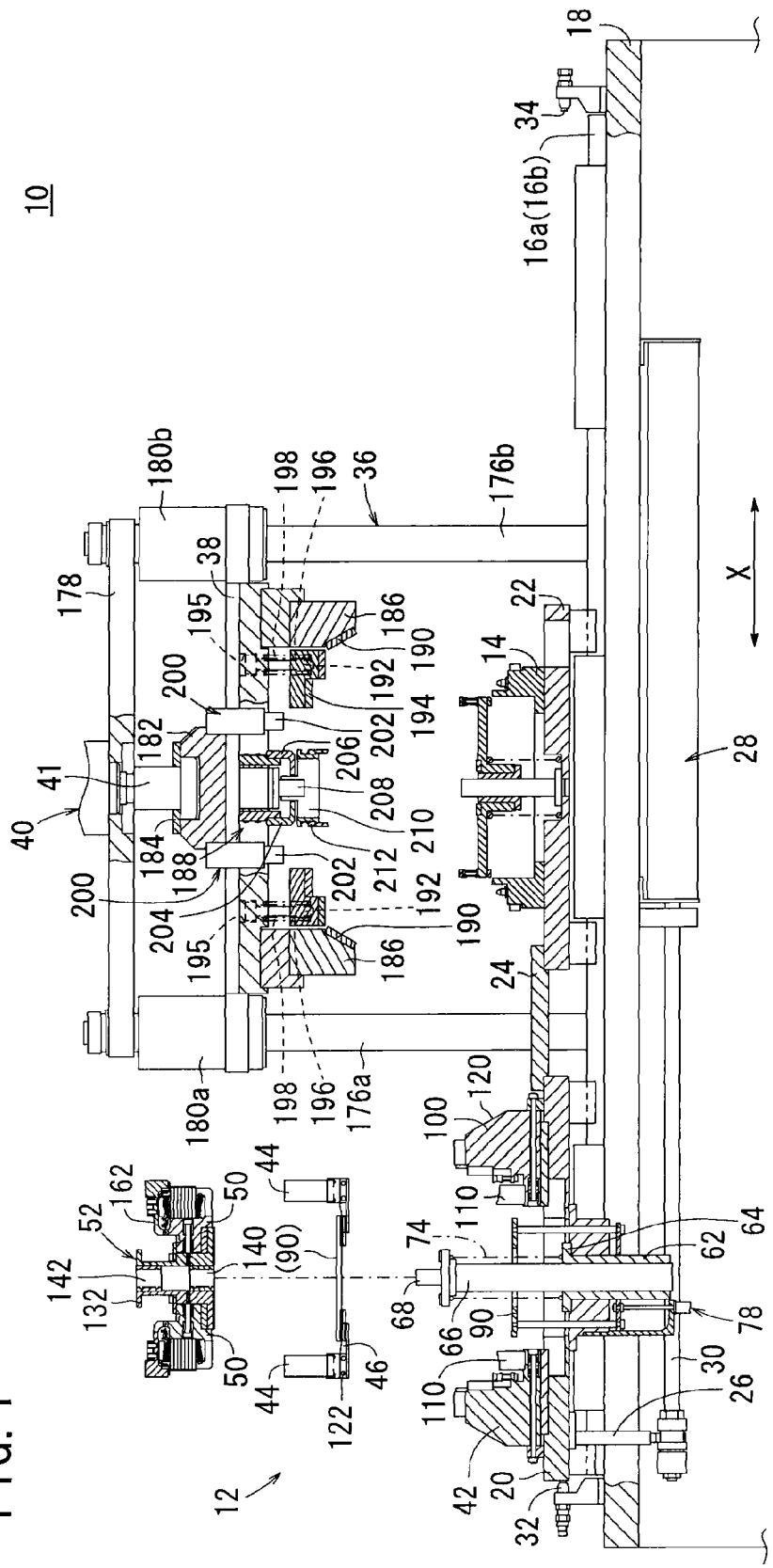
FIG. 1 is a front elevational view, partially in cross section, of a station including a stator manufacturing apparatus according to an embodiment of the present invention, the view showing a casing positioned below a vertical moving device.

FIG. 1 is a front elevational view, partially in cross section, of a station 12 including a stator manufacturing apparatus 10 according to an embodiment of the present invention. The station 12 doubles as a manufacturing station for producing a stator, and an accommodating station for placing the produced stator inside a casing 14.

Specifically, the station 12 includes a base 18 with a pair of guide rails 16a, 16b mounted on an upper surface thereof. The stator manufacturing apparatus 10 includes a base plate 20 slidably mounted on the guide rails 16a, 16b. The casing 14 is positioned on and fixed to a table 22, which is slidably mounted on the guide rails 16a, 16b. The base plate 20 and the table 22 are connected to each other by a connector 24. The base plate 20 has a lower surface coupled by a joint 26 to a first rod 30 of a working base moving cylinder 28, which is mounted on a lower surface of the base 18. When the first rod 30 is extended and retracted, the base plate 20 is displaced along the guide rails 16a, 16b in the directions indicated by the arrow X. The table 22 also is displaced along the guide rails 16a, 16b in the directions indicated by the arrow X.

A first limit switch 32 and a second limit switch 34 are mounted on the base 18 respectively, at opposite left and right ends of the guide rails 16a, 16b. When the first rod 30 is fully extended, as shown in FIG. 1, the base plate 20 engages with the first limit switch 32 at the left end of the guide rails 16a, 16b, and the table 22 with the casing 14 mounted thereon is positioned below a vertical moving device 36. At this time, the station 12 serves as an accommodating station.

Figure 2:
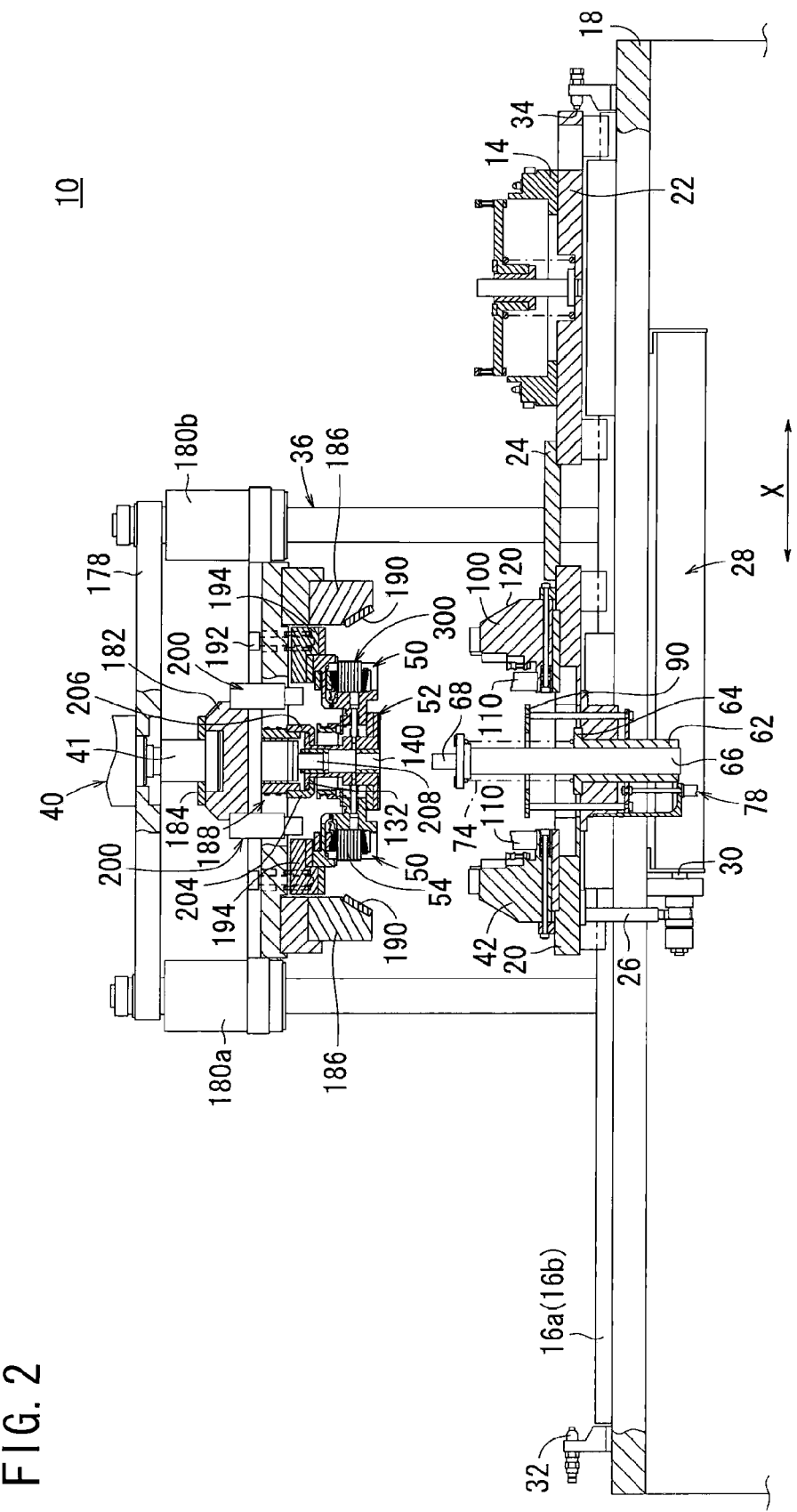
FIG. 2 is a front elevational view, partially in cross section, of the station, the view showing radially inward displacing jigs positioned below the vertical moving device.

When the first rod 30 is fully retracted, as shown in FIG. 2, the table 22 engages with the second limit switch 34 at the right end of the guide rails 16a, 16b, and the base plate 20 is positioned below the vertical moving device 36. At this time, the station 12 serves as a manufacturing station.

The vertical moving device 36 includes a movable plate 38 connected to a second rod 41 of a vertically moving cylinder 40. With the casing 14 being in the position shown in FIG. 1, the movable plate 38 is vertically movable toward and away from the casing 14 when the second rod 41 is extended and retracted. With the base plate 20 in the position shown in FIG. 2, the movable plate 38 is vertically movable toward and away from the base plate 20 when the second rod 41 is extended and retracted.

The station 12, which serves as a manufacturing station, includes the stator manufacturing apparatus 10 according to the present embodiment. The stator manufacturing apparatus 10 comprises a plurality of radially inward displacing jigs 42 displaceably mounted on the base plate 20, a plurality of spacer holding jigs 46 for holding spacers 44, which are made of an insulating material, a plurality of core holding jigs 50 for holding respective separate cores 48, and a holder 52 for holding the core holding jigs 50. In FIG. 1, the spacer holding jigs 46 are shown separately from the radially inward displacing jigs 42.

Each of the separate cores 48 comprises an arcuate yoke, a pole extending radially inward from the yoke, and a coil 54 wound around the pole. The structure of the separate cores 48 is well known by those skilled in the art, and will not be described in detail below.

Figure 3:
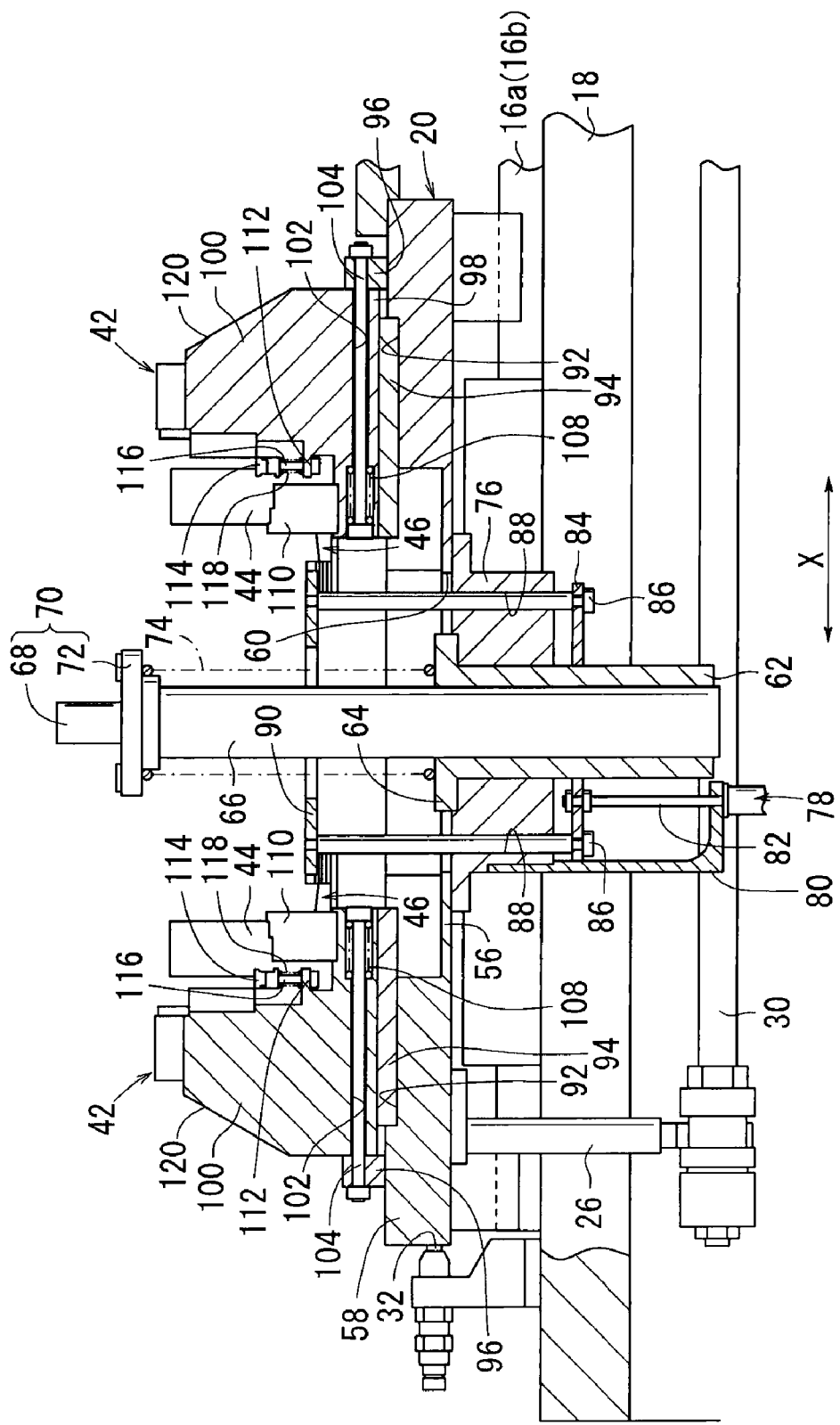
FIG. 3 is a vertical cross-sectional view of a base plate and radially inward displacing jigs of the stator manufacturing apparatus.

The base plate 20 is substantially circular in shape. As shown in FIG. 3, the base plate 20 includes a central thin portion 56 and a thick portion 58 surrounding the central thin portion 56. The central thin portion 56 includes a through hole 60 defined substantially centrally therethrough.

A sleeve 62, which extends vertically through the base 18, has an annular flange 64 disposed on an upper end thereof and projecting radially outward. A cylindrical member 66 is inserted through the sleeve 62. A flange member (engaging member) 70, having a protrusive cylindrical member 68 and a disk 72, is fitted over the upper distal end of the cylindrical member 66. A first helical spring 74 is interposed between the disk 72 and the flange 64, and is disposed around the cylindrical member 66. The flange member 70, and hence the cylindrical member 66, are normally urged resiliently so as to be moved vertically upward in FIG. 3 by means of the first helical spring 74.

The sleeve 62 has an upper end portion thereof surrounded by a fixing jig 76, which partially projects from the base 18. The fixing jig 76 holds a bracket 80 that supports a spacer moving cylinder 78, which acts as a spacer moving means.

A coupling plate 84 is connected to a third rod 82 of the spacer moving cylinder 78, and is slidably fitted over the sleeve 62 for vertical movement therealong. The coupling plate 84 includes an outer edge held slidably against the bracket 80. When the third rod 82 is extended and retracted, the coupling plate 84 is vertically displaced along the sleeve 62 and the bracket 80.

A plurality of elongate rods 86 extend vertically and have respective lower ends attached to the coupling plate 84. The rods 86 extend through respective through holes 88 defined in the fixing jig 76, and through a through hole 60 defined in the central thin portion 56 of the base plate 20, to respective positions near the radially inward displacing jigs 42.

The rods 86 have respective upper distal ends coupled to a circular pressing plate 90. When the third rod 82 is retracted, the circular pressing plate 90 is lowered to move the spacer holding jigs 46 vertically downward.

The thick portion 58 of the base plate 20 has a step 92 defined in an upper surface thereof. On the step 92, a sliding plate member 94 is disposed, having a low coefficient of friction for assisting in displacing the radially inward displacing jigs 42. An upstanding support plate 96 is mounted on the upper end of the thick portion 58 radially outward of the sliding plate member 94.

Each of the radially inward displacing jigs 42 on the sliding plate member 94 comprises a base 98, and a cam 100 that extends substantially vertically from the base 98. The cam 100 is slightly narrower than the base 98. The base 98 includes a horizontally extending tie rod hole 102 defined therein. A tie rod 104 is inserted through the tie rod hole 102. The tie rod 104 has an outer distal end retained by the support plate 96, and an inner head engaged by a second helical spring 108 that is seated on a wider step 106 in the end of the tie rod hole 102, which is positioned remotely from the support plate 96. The tie rod 104 is thus normally urged resiliently so as to be moved radially inward by means of the second helical spring 108. The base 98 supports a coil lower surface pressing member 110, mounted vertically thereon at a position facing an inner vertical wall of the cam 100. The coil lower surface pressing member 110 serves to press the lower surface of the coil 54 of a corresponding separate core 48.

The cam 100 includes a finger 112 extending toward the pressing plate 90 from an inner vertical wall thereof substantially parallel to the tie rod 104. A core lower surface pressing member 114 for pressing the lower surface of a corresponding separate core 48 is attached to the finger 112 by a connecting rod 116. The core lower surface pressing member 114 is normally urged resiliently to move vertically upward by a third helical spring (core urging means) 118 disposed around the connecting rod 116.

The cam 100 has an outer wall surface including a first tapered surface 120, which is slanted progressively downward in a radially outward direction.

Figure 4:
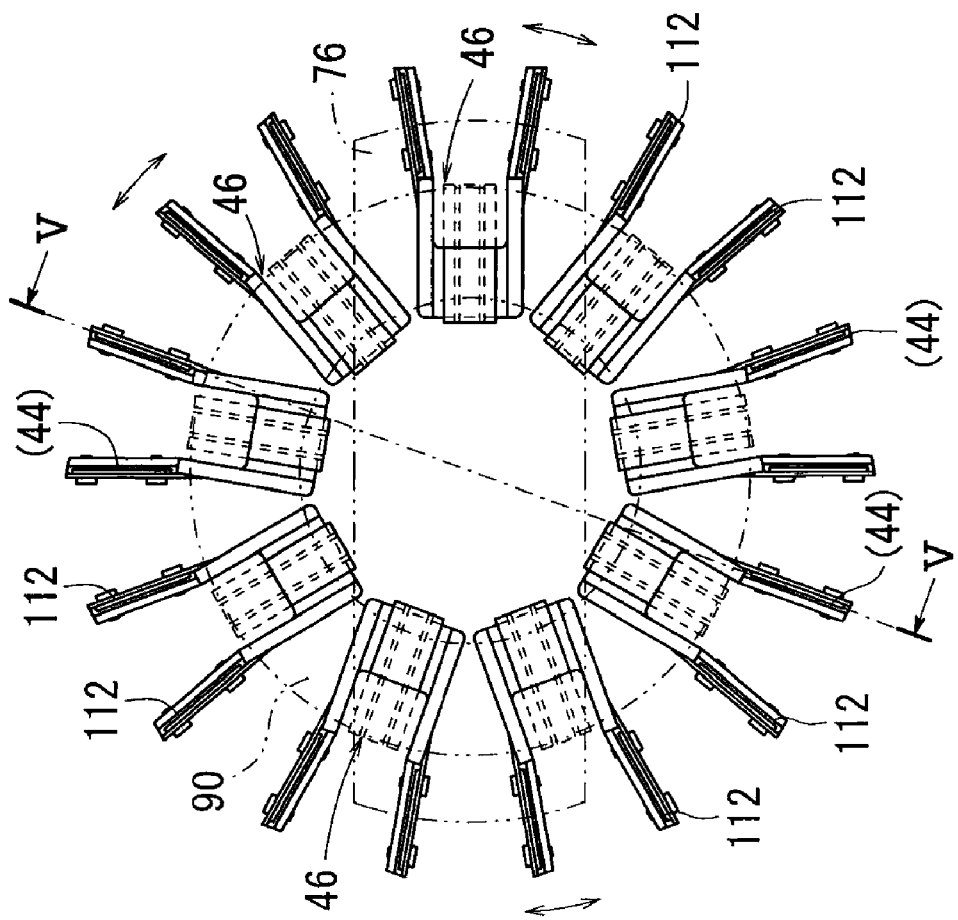
FIG. 4 is a plan view showing a positional relationship between a plurality of spacer holding jigs, a pressing plate, and a fixing jig.

As shown in FIG. 4, the spacer holding jigs 46 are arranged in an annular pattern and loosely held on the pressing plate 90, such that the spacer holding jigs 46 are displaceable in radial directions of the pressing plate 90.

Figure 5:
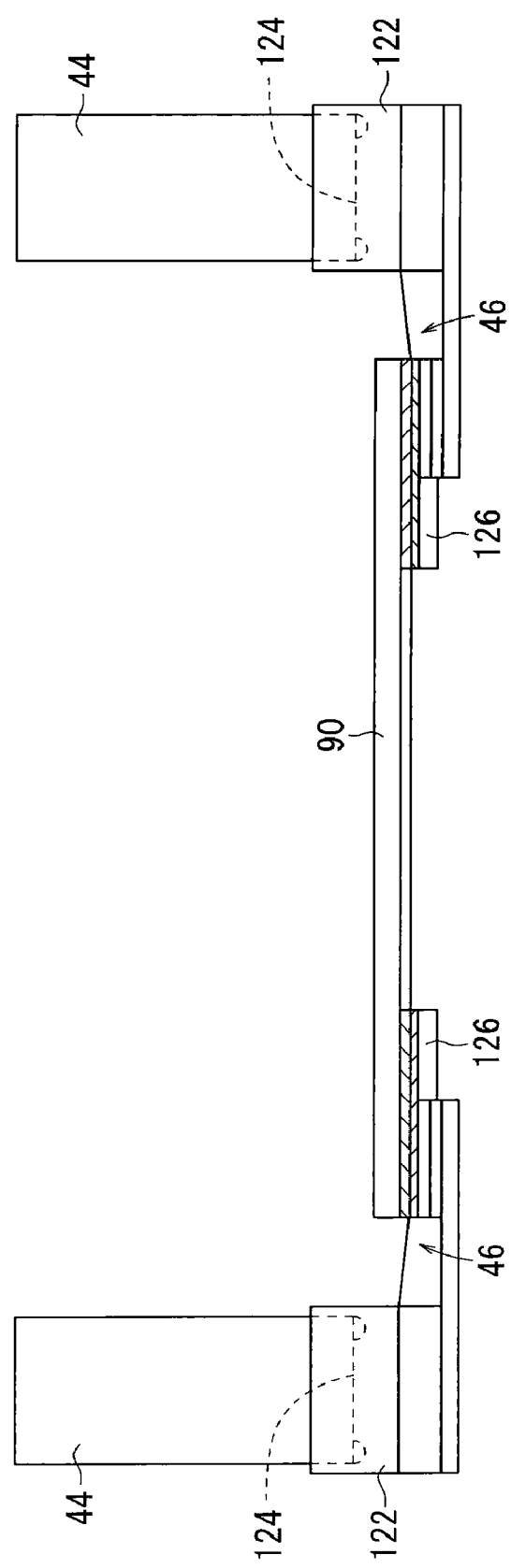
FIG. 5 is a cross-sectional view taken along line V-V of FIG. 4.

To each of the spacer holding jigs 46, there are connected two support members 122, which support respective spacers 44, each in the form of a rectangular plate, in an upright orientation. In other words, each of the spacer holding jigs 46 holds two spacers 44. As shown in FIG. 5, each of the support members 122 has an insertion slot 124 defined therein, with the corresponding spacer 44 being removably inserted inside the insertion slot 124.

The support members 122 are loosely fastened by screws, not shown, to shims 126, which are mounted on the lower surface of the pressing plate 90. Therefore, the support members 122 are swingable circumferentially along the pressing plate 90.

Figure 6:
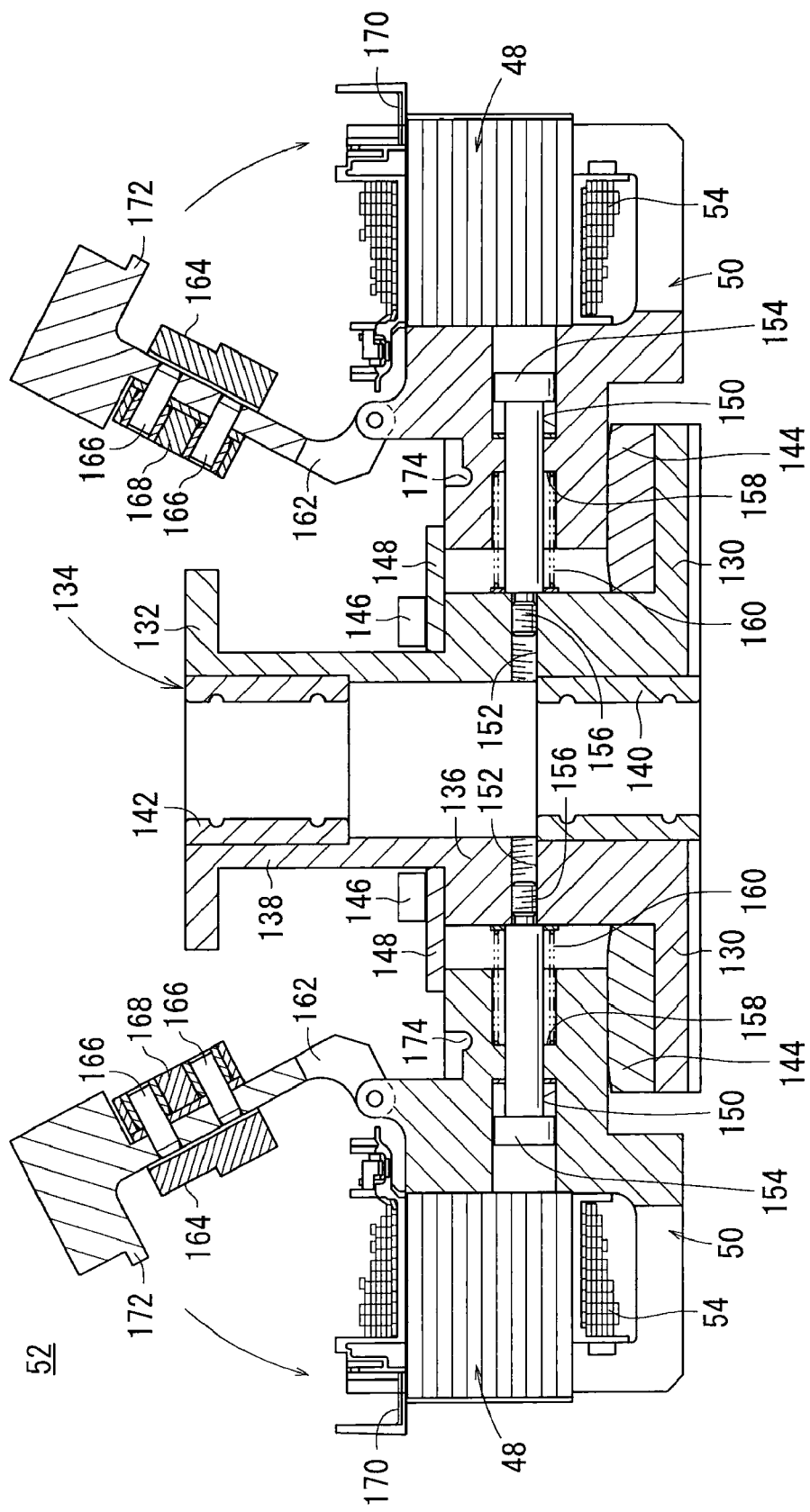
FIG. 6 is a vertical cross-sectional view of a holder, which holds a plurality of core holding jigs with separate cores mounted thereon.
Figure 7:
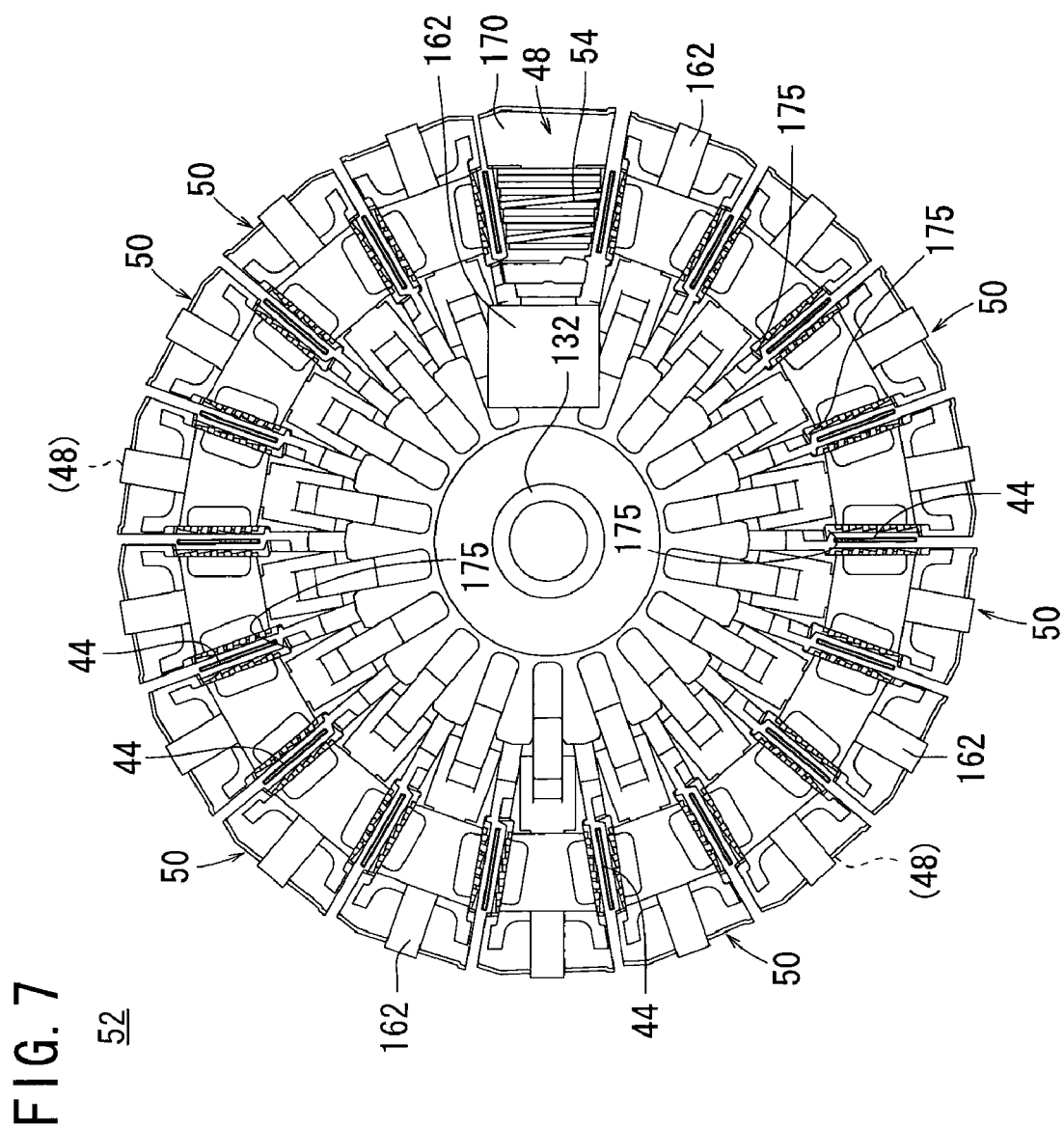
FIG. 7 is a plan view of the holder.

As shown in FIGS. 6 and 7, the holder 52 holds the core holding jigs 50 together collectively in an annular pattern. In FIG. 7, for illustrative purposes, the spacers 44 are shown as being interposed between adjacent coils 54.

Structural details of the holder 52 will be described below with reference to FIG. 6. The holder 52 includes a columnar member 134 having a large flange 130 and a small flange 132 formed respectively on a lower end and an upper end thereof. The columnar member 134 has a large-diameter portion 136 and a small-diameter portion 138 located between the large flange 130 and the small flange 132. The large-diameter portion 136 is contiguous to the large flange 130, and the small-diameter portion 138 is contiguous to the small flange 132. The columnar member 134 includes a hollow space, which extends from the large flange 130 to a substantially central portion of the large-diameter portion 136, and another hollow space, which extends from the small flange 132 to a substantially central portion of the small-diameter portion 138. A first bearing 140 and a second bearing 142 are fitted respectively into the hollow spaces.

A slide assistance member 144 having a low coefficient of friction for assisting in displacing the core holding jigs 50 is disposed on an upper surface of the large flange 130. A presser member 148 is coupled to an upper surface of the large-diameter portion 136 by bolts 146. The core holding jigs 50 are sandwiched slidably by the slide assistance member 144 and the presser member 148.

The core holding jigs 50 have respective bolt insertion holes 150 defined therethrough. The large-diameter portion 136 of the columnar member 134 includes internally threaded holes 152 defined in a substantially central portion thereof. Bolts 154, which are inserted through the respective bolt insertion holes 150, have externally threaded distal end portions 156 that are threaded in the internally threaded holes 152, respectively.

The bolt insertion holes 150 include respective steps 158 on which ends of fourth helical springs 160 are seated, whereas opposite ends of the fourth helical springs 160 are held against an outer wall surface of the large-diameter portion 136. The core holding jigs 50 normally are urged resiliently by the fourth helical springs 160 so as to move radially outward away from the columnar member 134.

The core holding jigs 50 have respective arms 162 pivotally mounted on upper portions thereof by respective hinge mechanisms. Each of the arms 162 has a first coil upper surface pressing member 164, formed on an inner surface thereof, which faces a corresponding separate core 48, for pressing the upper surface of the coil 54 of the separate core 48. The first coil upper surface pressing member 164 is positioned on and fixed to the arm 162 by two coupling pins 166, which are covered by a cover member 168. If any clearance exists between the cover member 168 and the arm 162, then when the cover member 168 is pressed toward the upper surface of the arm 162, the coupling pin 166 is displaced so as to project from the lower surface of the arm 162, thereby pushing the first coil upper surface pressing member 164 away from the lower surface of the arm 162.

Each of the arms 162 includes a tooth 172 projecting from the lower surface thereof, which is inserted into a recess 170 defined in the yoke of the corresponding separate core 48. As described later, when the tooth 172 is inserted into the recess 170, the tooth 172 holds the upper surface of the separate core 48 vertically downward. The tooth 172 thus serves as a core upper surface holder.

Each of the core holding jigs 50 has a cavity 174 defined in an upper surface thereof near the arm 162. As shown in FIG. 7, each of the core holding jigs 50 also has a key cavity 175 defined in a portion thereof where the spacer 44 is placed.

As shown in FIGS. 1 and 2, the vertical moving device 36 for vertically moving the holder 52 comprises a pair of post members 176a, 176b vertically mounted on the base 18, and a bridge member 178 that extends horizontally between the post members 176a, 176b. The post members 176a, 176b and the bridge member 178 jointly provide a gate-like structure. The bridge member 178 supports the vertically moving cylinder 40 thereon.

The movable plate 38 is supported on a pair of bearing members 180a, 180b, which are slidably fitted over the respective post members 176a, 176b. The second rod 41 of the vertically moving cylinder 40 is inserted into a rod bearing 182, which is mounted substantially centrally on the movable plate 38. A washer 184 is fitted over the second rod 41 for locking the second rod 41 and preventing removal of the second rod 41 from the rod bearing 182.

Cams 186, which are the same in number as the radially inward displacing jigs 42, hang from the lower surface of the movable plate 38. The cams 186 have respective end surfaces that face toward a chuck (gripping means) 188 mounted centrally on the lower surface of the movable plate 38. The end surfaces of the cams 186 include respective second tapered surfaces 190, which are slanted progressively downward in an outward radial direction.

A second coil upper surface pressing member 194 is positioned by a guide pin 192 on the movable plate 38, radially inward of each of the cams 186. The guide pin 192 is slidably movable with respect to the movable plate 38, and has an upper end thereof retained in a retaining hole 195 defined in the movable plate 38. A fifth helical spring 198 is inserted into an insertion hole 196, which is defined in the second coil upper surface pressing member 194 and the movable plate 38. The second coil upper surface pressing member 194 is normally urged resiliently, so as to be moved vertically downward by the fifth helical spring 198. The second coil upper surface pressing member 194 is vertically displaceable along the guide pin 192 while the fifth helical spring 198 is compressed and expanded.

Pressing cylinders (pressing means) 200 are supported on the movable plate 38 and disposed between the second coil upper surface pressing members 194 and the chuck 188. The pressing cylinders 200 have respective fourth rods 202, which are vertically movable, i.e., the fourth rods 202 can be vertically extended and retracted.

The chuck 188 has a first arm 204 and a second arm 206, which have respective horizontal hands for holding the lower surface of the small flange 132 of the columnar member 134 of the holder 52. An engaging shaft 208, which is mounted on and hangs from the movable plate 38, extends vertically between the horizontal hands of the first arm 204 and the second arm 206.

A coupling sleeve 210 is coupled to the engaging shaft 208. An engaging sleeve 212 is fitted movably over the coupling sleeve 210 for vertical movement with respect to an outer wall surface of the coupling sleeve 210. When the engaging sleeve 212 is lowered, the lower distal end thereof ultimately engages within the cavities 174 of the core holding jigs 50.

The station 12 that incorporates the stator manufacturing apparatus 10 according to the present embodiment basically is constructed as described above. Operations and advantages of the station 12 will be described below.

The separate cores 48 are assembled into an annular stator in the following manner. First, the separate cores 48, each comprising a coil 54 wound around a pole, are mounted on the core holding jigs 50 (see FIG. 6).

Figure 8:
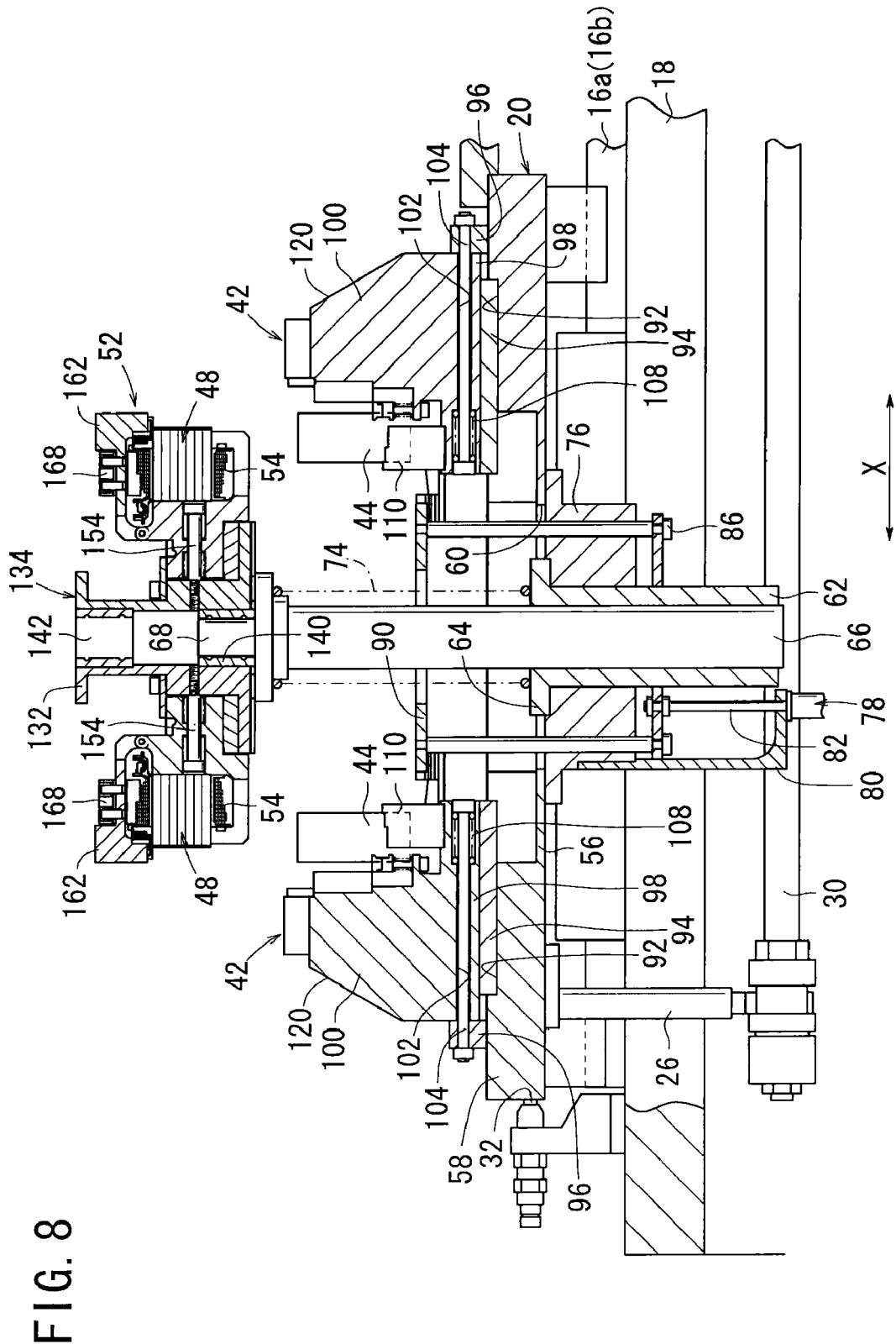
FIG. 8 is a vertical cross-sectional view showing a holder, which is fitted over a protrusive cylindrical member of a flange member.

Then, as shown in FIG. 8, the arms 162 are lowered to insert the teeth 172 provided on lower surfaces of the arms 162 into corresponding recesses 170 provided in the yokes of the separate cores 48. The first coil upper surface pressing members 164 on the arms 162 are thus positioned closely to or in abutment against the coils 54.

Then, the first bearing 140, which is fitted into the corresponding hollow space in the columnar member 134 of the holder 52, is fitted over the protrusive cylindrical member 68 of the flange 70, which is fitted over the upper distal end of the cylindrical member 66. The first helical spring 74 is slightly compressed under the weight of the holder 52 and the separate cores 48. At this time, the base plate 20 is positioned in engagement with the first limit switch 32, as shown in FIG. 1.

Figure 9:
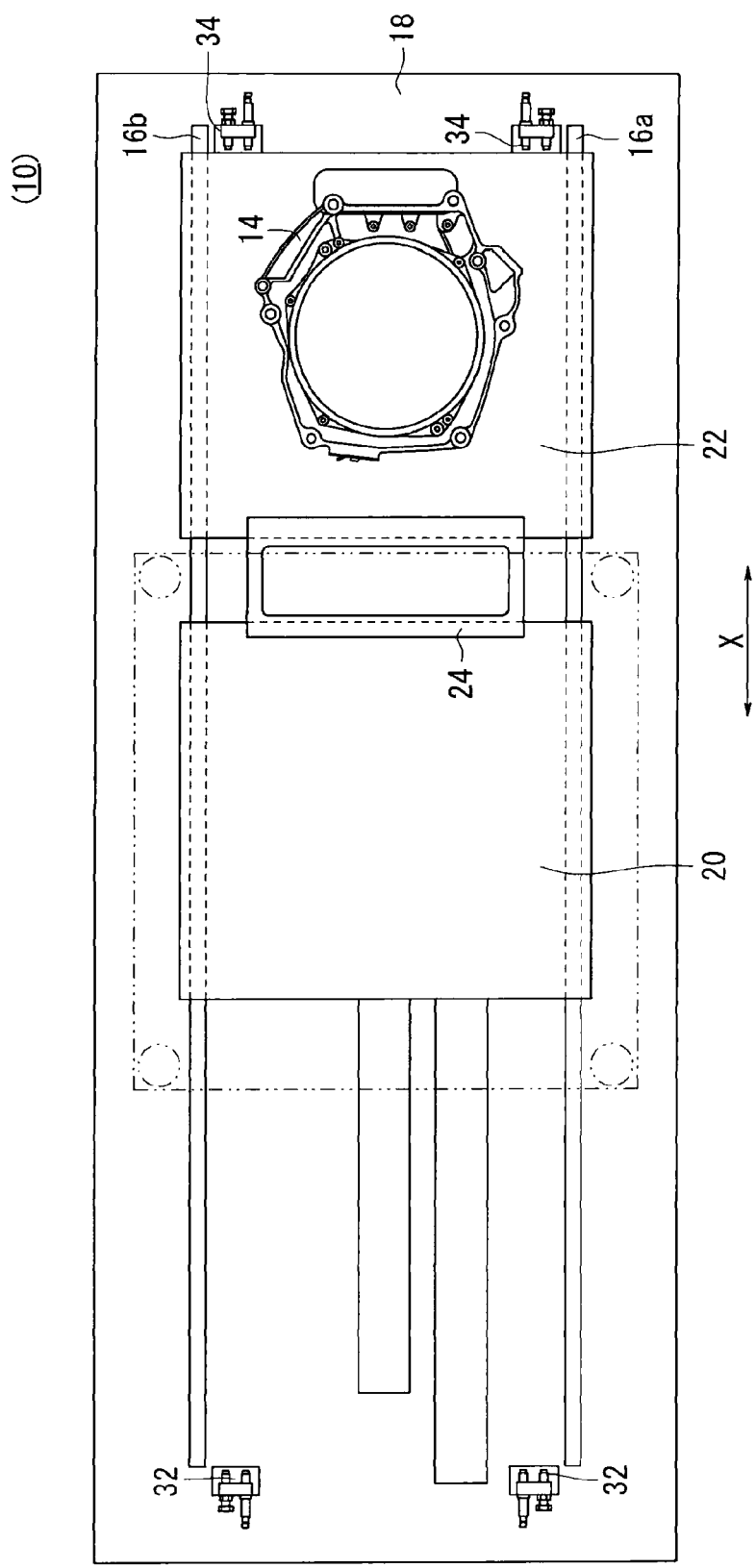
FIG. 9 is a plan view of the station, showing the holder positioned below the vertical moving device.

Then, the working base moving cylinder 28 is actuated in order to retract the first rod 30 to the right, as shown in FIG. 1. The base plate 20 and the table 22 are displaced to the right along the guide rails 16a, 16b until the table 22 ultimately engages with the second limit switch 34, whereupon the base plate 20 and the table 22 stop moving. The holder 52 is thus positioned below the vertical moving device 36, as shown in FIG. 9.

Figure 10:
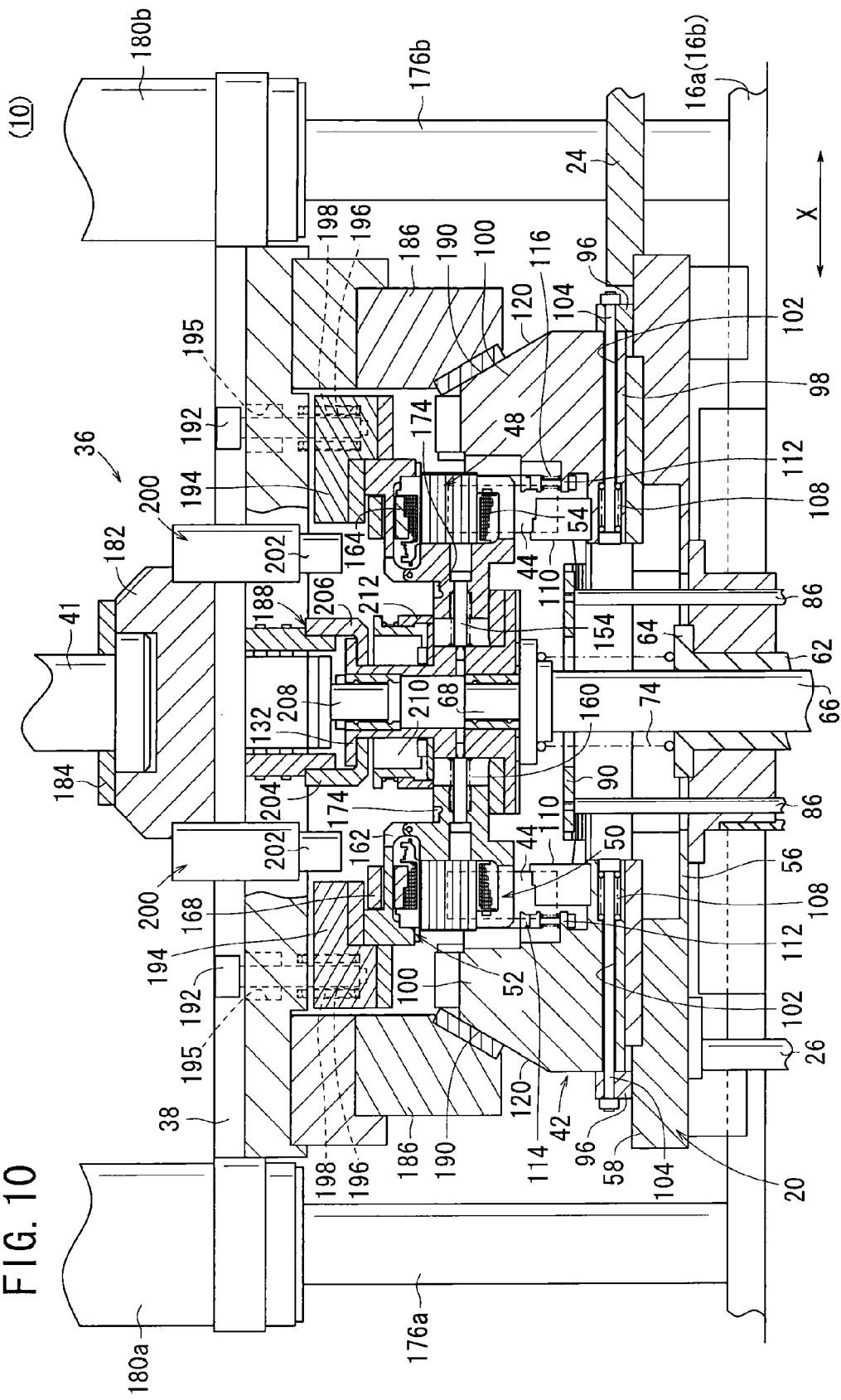
FIG. 10 is a vertical cross-sectional view of the station, showing a movable plate that is lowered.

Then, the vertically moving cylinder 40 is actuated in order to extend the second rod 41 vertically downward. As shown in FIG. 10, the movable plate 38 is lowered so as to insert the engaging shaft 208 into the second bearing 142, in the corresponding hollow space in the columnar member 134 of the holder 52.

Continued descent of the movable plate 38 causes the engaging shaft 208 to press the holder 52. The pressing force with which the engaging shaft 208 presses the holder 52 is greater than the resilient force of the first helical spring 74, such that the first helical spring 74 is compressed and the cylindrical member 66 starts to be lowered. As shown in FIG. 7, the spacers 44 are inserted between the adjacent coils 54 of the separate cores 48. Since the support members 122 are swingable along the circumferential direction of the pressing plate 90, as the cylindrical member 66 descends, the support members 122 are swung until the spacers 44 reach respective appropriate positions.

As shown in FIG. 10, the second coil upper surface pressing members 194, which are coupled to the movable plate 38, press against upper surfaces of the arms 162, thereby holding the upper surfaces of the separate cores 48. At this time, the fifth helical springs 198 are compressed, thus pushing the guide pins 192 out of the retaining holes 195.

Figure 11:
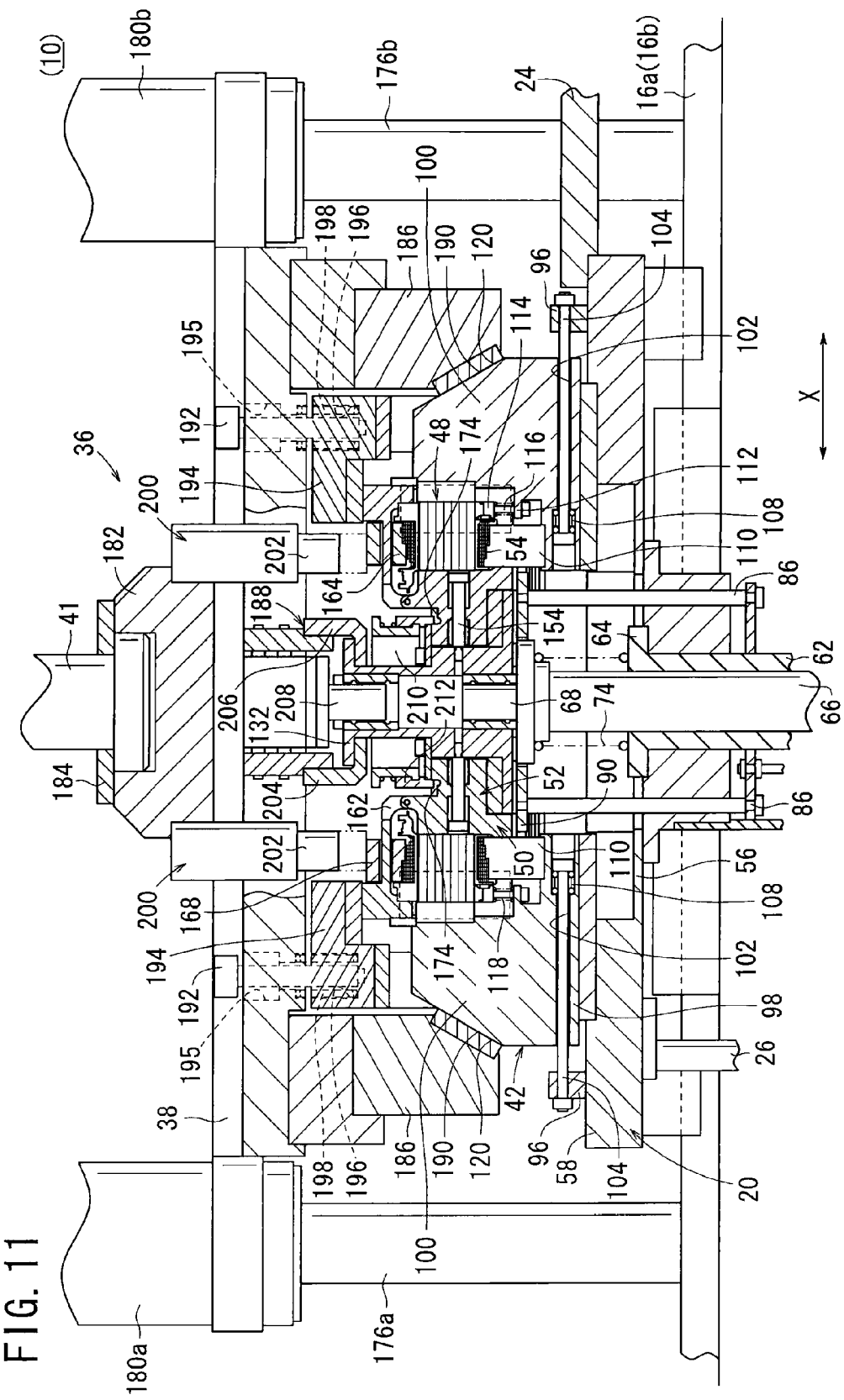
FIG. 11 is a vertical cross-sectional view of the station, showing the manner in which the movable plate is further lowered from the position shown in FIG. 10, so as to displace the radially inward displacing jigs and the core holding jigs.

The second tapered surfaces 190 of the cams 186 engage with the first tapered surfaces 120 of the cams 100 of the radially inward displacing jigs 42. The descending cams 186 apply pressing forces to the first tapered surfaces 120 of the cams 100 via the second tapered surfaces 190 thereof. As a result, as shown in FIG. 11, all of the radially inward displacing jigs 42 begin to be displaced radially inward, while being guided by the tie rods 104, thereby compressing the second helical springs 108.

Figure 12:
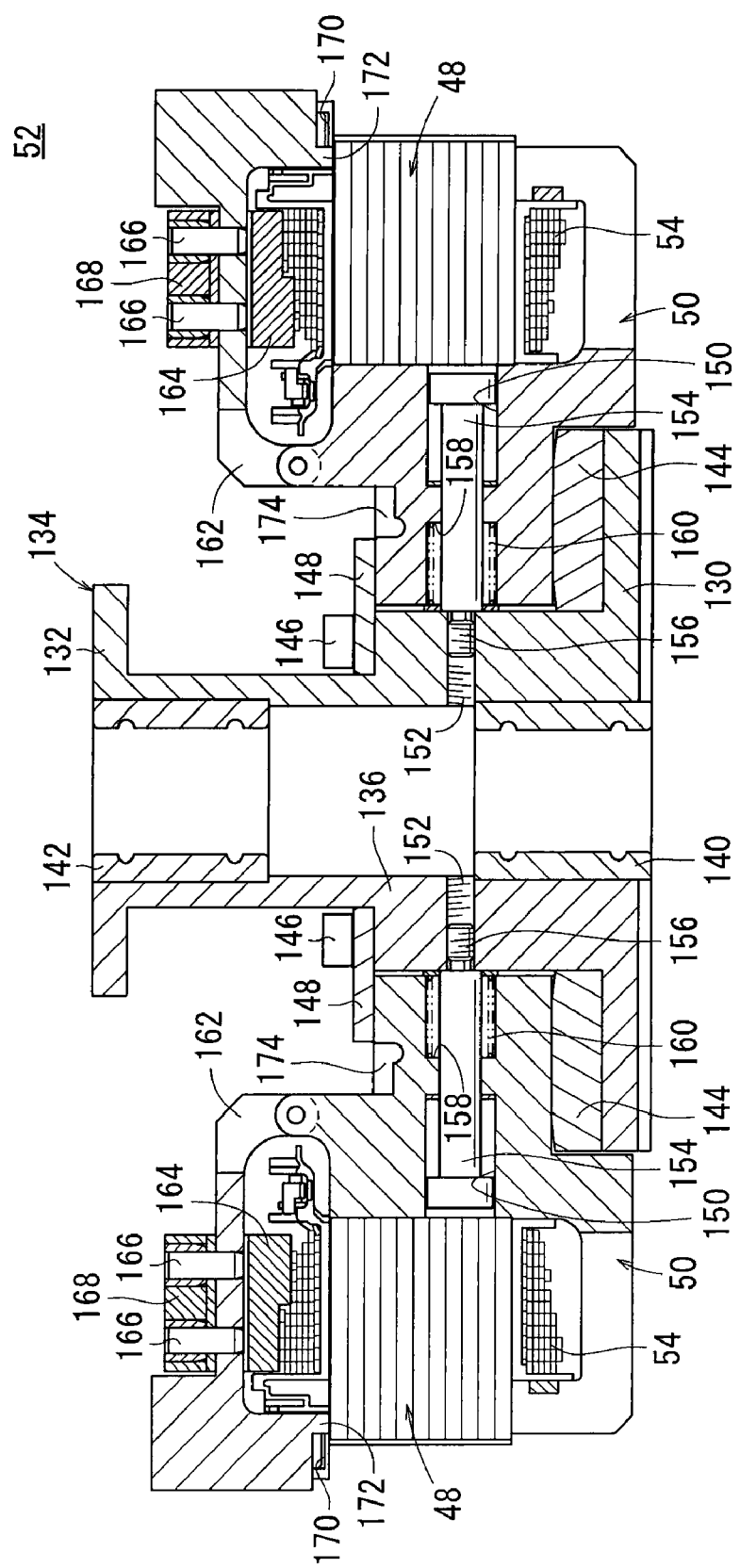
FIG. 12 is a vertical cross-sectional view of the holder, showing the core holding jigs that are displaced.

The core holding jigs 50 are pressed by the radially inward displacing jigs 42. As a result, as shown in FIG. 12, the core holding jigs 50 start being displaced radially inward while being guided by the bolts 154, thereby compressing the fourth helical springs 160. The sliding plate member 94 disposed beneath the bases 98 of the radially inward displacing jigs 42, and the slide assistance member 144 disposed on the upper surface of the large flange 130, allow the radially inward displacing jigs 42 and the core holding jigs 50 to be smoothly displaced radially inward.

At the same time, the spacers 44 engage within the respective key cavities 175 (see FIG. 7) defined in the core holding jigs 50, whereupon the spacers 44 are displaced in unison with the core holding jigs 50, owing to the fact that the spacer holding jigs 46 are displaceable in radial directions of the pressing plate 90.

When the movable plate 38 is fully lowered, the first helical spring 74, the second helical springs 108, the third helical springs 118, the fourth helical springs 160, and the fifth helical springs 198 are fully compressed. As shown in FIGS. 11 and 12, at this time, the radially inward displacing jigs 42 and the core holding jigs 50 are displaced at a maximum stroke.

Figure 13:
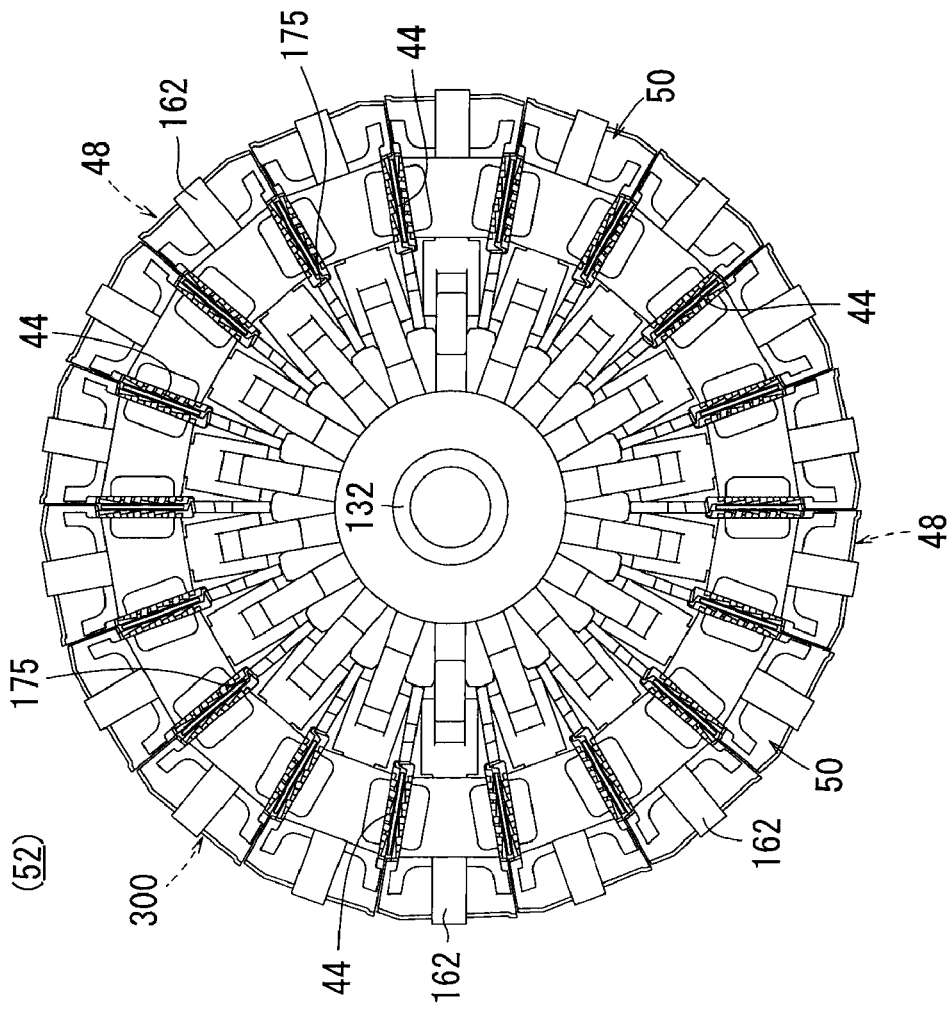
FIG. 13 is a plan view of the holder shown in FIG. 12.

As a result, as shown in FIG. 13, the core holding jigs 50 are brought maximally close to each other, thereby making up an annular assembly.

While the radially inward displacing jigs 42 and the core holding jigs 50 are displaced, the holder 52 is positioned by the protrusive cylindrical member 68, which is fitted into the first bearing 140 in the columnar member 134, and by the engaging shaft 208 that is fitted in the second bearing 142. Since the columnar member 134 is positioned substantially centrally in the radial direction of the holder 52, the radially inward displacing jigs 42 and the core holding jigs 50, as well as the separate cores 48, are displaced toward the center of the holder 52.

Inasmuch as the separate cores 48 are displaced at substantially equal speeds toward the center of the positioned holder 52, the separate cores 48 are prevented from becoming shifted out of position. Consequently, the core holding jigs 50 can be combined quickly into an annular assembly.

The recesses 170 and the teeth 172 are disposed at different positions on the yokes of the separate cores 48. Since the core holding jigs 50 are placed together into the annular assembly, the recess 170 in the yoke of one of the separate cores 48 receives the tooth 172 on the yoke of an adjacent right separate core 48, and the tooth 170 on the yoke of the one adjacent separate core 48 is fitted into the recess 172 in the yoke of an adjacent left separate core 48. When the separate cores 48 are placed together by interfitting engagement of the recesses 170 and the teeth 172, the separate cores 48 jointly make up an annular stator 300. The spacers 44, which are made of an insulating material, prevent adjacent coils 54 from becoming short-circuited.

At the same time, the coils 54 are compressed radially inward as a result of being pressed by the radially inward displacing jigs 42.

In the stator 300, the separate cores 48 have respective heights which are equal to each other. This is because when the stator 300 is assembled, the separate cores 48 have lower surfaces thereof pressed by the core lower surface pressing members 114, which are resiliently urged by the third helical springs 118, while the upper surfaces thereof are held by the teeth 172 of the arms 162, which engage within respective recesses 170 provided in the yokes.

Then, the pressing cylinders 200 are actuated to extend the fourth rods 202 vertically downward (see FIG. 11). The fourth rods 202 press the cover members 168, thereby displacing the coupling pins 166 and the first coil upper surface pressing members 164 toward upper surfaces of the coils 54. Finally, the first coil upper surface pressing members 164 apply pressing forces to the upper surfaces of the coils 54.

Lower surfaces of the coils 54 are supported by the coil lower surface pressing members 110. Therefore, when pressing forces are applied to upper surfaces of the coils 54, the coils 54 are subjected to reactive forces from the coil lower surface pressing members 110. Stated otherwise, pressing forces are applied to lower surfaces of the coils 54 by the coil lower surface pressing members 110.

Consequently, after the coils 54 have been compressed radially of the annular stator 300, the coils 54 are compressed from lower and upper surfaces thereof as the pressing cylinders 200 are actuated. The coils 54 thus compressed increase the space factor inside the annular stator 300.

According to the present embodiment, the coils 54 are compressed and the stator 300 is assembled, simply by setting the core holding jigs 50 with the separate cores 48 mounted thereon onto the holder 52, and then lowering the movable plate 38 toward the holder 52, thereby causing the cams 186 to displace the radially inward displacing jigs 42 and the core holding jigs 50. In other words, the stator 300 can be assembled highly efficiently.

Then, the first arm 204 and the second arm 206 of the chuck 188 are displaced toward each other, thus causing the horizontal hands thereof to hold the small flange 132 of the holder 52. Thereafter, the vertically moving cylinder 40 is actuated to retract the second rod 41 vertically upward. The movable plate 38 is lifted to release the holder 52, which holds the stator 300 away from the radially inward displacing jigs 42, as shown in FIG. 2. At this time, the first helical spring 74 and the second helical springs 108 are extended, so as to enable the cylindrical member 66 and the radially inward displacing jigs 42 to return to their original positions, under the resiliency of the first and second helical springs 74, 108.

The spacers 44 are released from the insertion slots 124 of the support members 122, and are elevated in unison with the stator 300 while being interposed between the adjacent coils 54.

Since the lower distal end of the engaging sleeve 212 remains engaged in the cavities 174 in upper surfaces of the core holding jigs 50, the fourth helical springs 160 remain compressed, thereby holding the core holding jigs 50 closely to each other. In other words, the stator 300 will not become disintegrated.

Next, the working base moving cylinder 28 is actuated to extend the second rod 41 to the left. The base plate 20 and the table 22 are displaced to the left along the guide rails 16a, 16b until the base plate 20 engages with the first limit switch 32, whereupon the base plate 20 and the table 22 stop moving. At this time, the casing 14 is positioned below the vertical moving device 36 (see FIG. 1).

Figure 14:
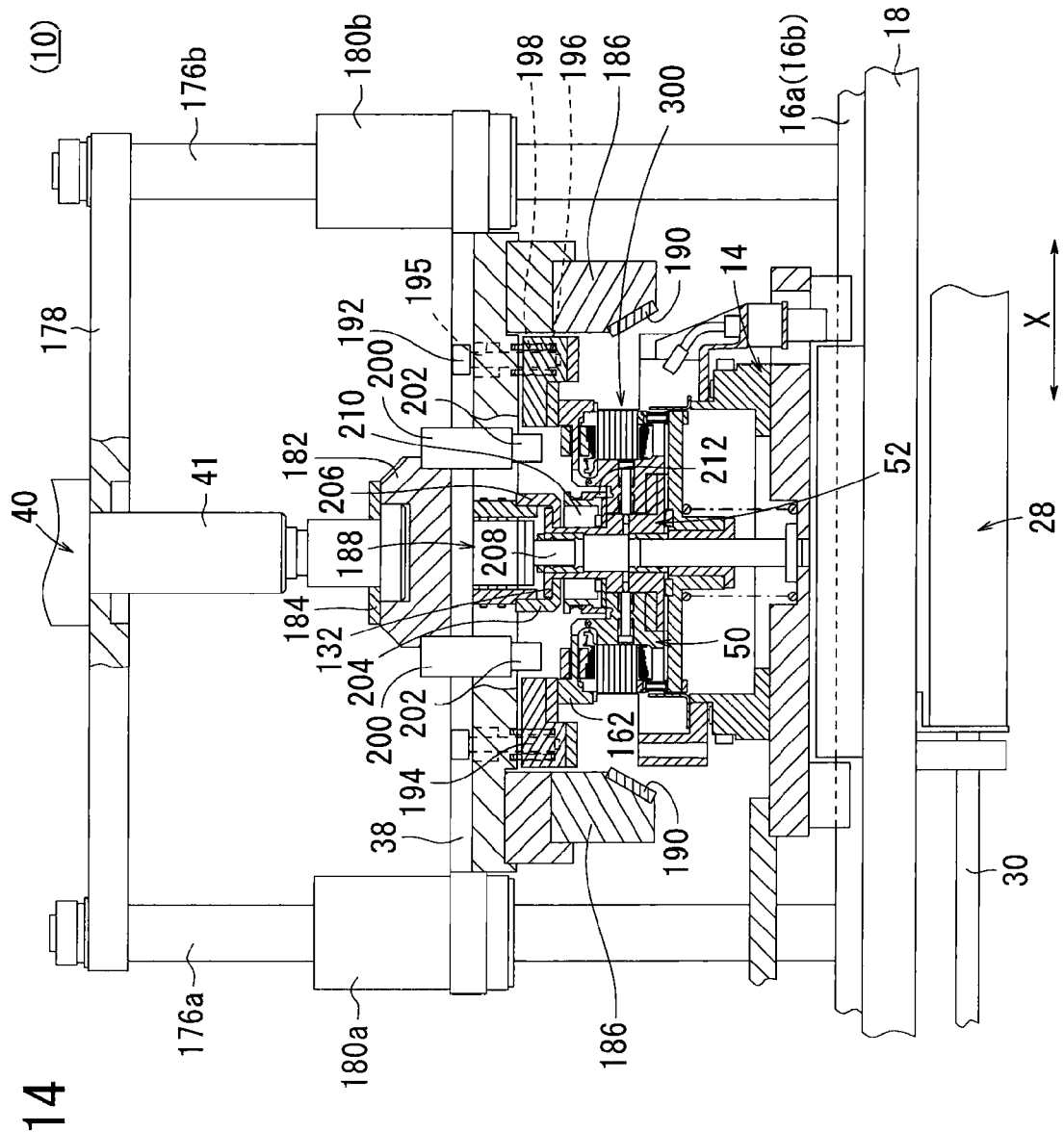
FIG. 14 is a vertical cross-sectional view showing the manner in which the stator and the holder are inserted into the casing.

Then, the vertically moving cylinder 40 is actuated again to extend the second rod 41 vertically downward, thereby lowering the movable plate 38. As a result, as shown in FIG. 14, the stator 300 together with the holder 52 starts to be inserted into the casing 14. The stator 300 and the casing 14 jointly makeup an electric rotary machine when the stator 300 is fully inserted.

Finally, the chuck 188 releases the small flange 132 of the holder 52, and the movable plate 38 is elevated. Thereafter, the arms 162 of the holder 52 are lifted, and the holder 52 is pulled off. The holder 52 is released, leaving only the stator 300 inside the casing 14.

According to the present embodiment, as described above, the stator 300 can continuously be assembled and inserted into the casing 14. Therefore, the stator 300 can be manufactured highly efficiently.

The separate cores 48 have connectors at the ends of the coils 54 and silicone resin inlets on upper surfaces thereof. Since the separate cores 48 of the produced stator 300 have heights that are equal to each other, as described above, the connectors are accurately positioned at the ends of the coils 54, and the silicone resin inlets are accurately positioned on the upper surfaces of the separate cores 48.

In the illustrated embodiment, the spacers 44 are lifted in unison with the stator 300, so as to become released from the support members 122. However, the spacers 44 may be replaced with shims, which are mounted in a non-removable manner on the support members 122, wherein the adjacent coils 54 are spaced apart from each other by the shims.

According to such a modification, after the stator 300 has been produced, the movable plate 38 is lifted in order to release the cams 186 from the cams 100. The second helical springs 108 are extended, thereby causing the radially inward displacing jigs 42 to be retracted. As a result, the adjacent coils 54 become connected slightly loosely.

Then, the spacer moving cylinder 78 is actuated in order to retract the third rod 82. The coupling plate 84, the elongate rods 86, and the pressing plate 90 are lowered vertically downward, together with the spacer holding jigs 46 and the shims. The shims thus are retracted from between the adjacent coils 54.

Thereafter, the coils 54 are radially and vertically compressed, and the stator 300 is assembled and inserted into the casing 14, as described above.

In the illustrated embodiment, the key cavities 175 for moving the spacers 44 are defined in the core holding jigs 50. However, alternatively, the key cavities 175 may also be defined in the radially inward displacing jigs 42.

Although a certain preferred embodiment of the present invention has been shown and described in detail, it should be understood that various changes and modifications may be made to the disclosed embodiment without departing from the scope of the invention as set forth in the appended claims.

What is claimed is:

1. A stator manufacturing apparatus for joining a plurality of separate cores, each carrying a coil wound thereon, into an annular stator, comprising:
   a base plate;
   a plurality of radially inward displacing jigs disposed radially in an annular pattern on the base plate and which are radially displaceable toward and away from each other;
   a plurality of core holding jigs disposed radially inward of the radially inward displacing jigs and which are radially displaceable toward and away from each other;
   a movable plate disposed vertically upward of the base plate and which is vertically movable toward and away from the base plate;
   a cam disposed on the movable plate for displacing the radially inward displacing jigs radially toward each other when the movable plate is lowered; and
   a spacer holding jig having a holding means for holding spacers that are inserted between adjacent ones of the separate cores, wherein when the cam is lowered in unison with the movable plate, the cam presses the radially inward displacing jigs to displace the radially inward displacing jigs radially inward toward each other for thereby compressing the coils radially, and wherein the core holding jigs are displaced radially inward toward each other in unison with the radially inward displacing jigs for thereby joining the separate cores held by the core holding jigs into a stator.

2. The stator manufacturing apparatus according to claim 1, wherein the radially inward displacing jigs have respective lower surface pressing members for pressing respective lower surfaces of the coils, and the core holding jigs have respective upper surface pressing members for pressing respective upper surfaces of the coils, the movable plate including a pressing means which is vertically movably mounted thereon; and
   wherein after the coils are compressed radially, the pressing means is lowered vertically downward from the movable plate, thereby causing the lower surface pressing members and the upper surface pressing members to compress the lower and upper surfaces, respectively, of the coils.

3. The stator manufacturing apparatus according to claim 1, wherein the core holding jigs include respective core upper surface holders for holding respective upper surfaces of the separate cores vertically downward.

4. The stator manufacturing apparatus according to claim 1, wherein the radially inward displacing jigs include respective core urging means for urging respective lower surfaces of the separate cores vertically upward; and the separate cores, which are urged by the core urging means, are held against the core upper surface holders, respectively.

5. The stator manufacturing apparatus according to claim 1, further comprising:
- a holder for holding the core holding jigs in an annular pattern;
- an engaging member positioned centrally in the annular pattern made up of the radially inward displacing jigs; and
- gripping means for gripping the holder;
- wherein the holder includes a columnar member positioned centrally in the annular pattern made up of the core holding jigs;
- the columnar member includes a flange disposed on an upper end thereof, and an insertion opening defined in a lower end thereof;
- the gripping means grips the flange for feeding the core holding jigs together with the holder; and
- when the engaging member engages in the insertion opening, the holder is positioned and fixed so as to bring the annular pattern made up of the radially inward displacing jigs and the annular pattern made up of the core holding jigs into coaxial alignment with each other.

6. The stator manufacturing apparatus according to claim 5, wherein the columnar member comprises a hollow member having a hollow space therein, and the engaging member is inserted in the hollow space of the columnar member.

7. The stator manufacturing apparatus according to claim 1, further comprising:
- spacer moving means for moving the spacer holding jig vertically downward;
- wherein after the coils are compressed radially, the spacer moving means moves the spacer holding jig vertically downward in order to release the spacers from between adjacent separate cores.

* * * * *

UNITED STATES PATENT AND TRADEMARK OFFICE
CERTIFICATE OF CORRECTION

PATENT NO. : 7,886,426 B2
APPLICATION NO. : 12/496986
DATED : February 15, 2011
INVENTOR(S) : Hiroshi Sakakibara Page 1 of 1

It is certified that error appears in the above-identified patent and that said Letters Patent is hereby corrected as shown below:

Title Page:

In (30)    Foreign Application Priority Data, please correct the Foreign Application Priority Data to read as follows:

(30)    July 22, 2008   (JP)   2008-188634

Signed and Sealed this
Nineteenth Day of April, 2011

David J. Kappos
*Director of the United States Patent and Trademark Office*